United States Patent

[11] 3,619,204

| [72] | Inventor | Saul Katz |
| | | Monsey, N.Y. |
| [21] | Appl. No. | 791,156 |
| [22] | Filed | Jan. 14, 1969 |
| [45] | Patented | Nov. 9, 1971 |
| [73] | Assignee | General Foods Corporation |
| | | White Plains, N.Y. |

[54] PREPARATION OF PARTICULATE MATTER FOR FREEZE DRYING
3 Claims, No Drawings

[52] U.S. Cl. ................................................. 99/71,
34/5, 99/199
[51] Int. Cl. ........................................................ A23f 1/08
[50] Field of Search ............................................ 99/71, 199,
77; 34/5

[56] References Cited
UNITED STATES PATENTS

| 3,293,766 | 12/1966 | Togashi et al. | 34/5 |
| 3,309,779 | 3/1967 | Ginnette et al. | 34/5 |
| 3,373,042 | 3/1968 | Elerath et al. | 99/71 |
| 3,399,061 | 8/1968 | Lutz | 99/71 |
| 3,419,399 | 12/1968 | Earle, Jr. et al. | 99/71 |
| 3,443,962 | 5/1969 | Elerath | 99/71 |
| 3,445,247 | 5/1969 | Baerwald | 99/199 |
| 2,292,447 | 8/1942 | Irwin, Jr. | 99/199 |
| 2,431,496 | 11/1947 | Natelson et al. | 99/71 |
| 2,509,681 | 5/1950 | Flosdorf | 99/206 |
| 3,021,218 | 2/1962 | Clinton et al. | 99/71 |
| 3,482,990 | 12/1969 | Pfluger et al. | 99/77 X |

*Primary Examiner*—Dennis E. Talbert, Jr.
*Attorneys*—Gerald E. Jacobs and Bruno P. Struzzi ABSTRACT: A new method of preparing an extract for freeze drying has been discovered which is readily adaptable for a continuous or a batch freeze drying system. The extract is passed through a continuous crystallizer and the slush formed therein is extruded into a vacuum. The extruded ropes are frozen to below the eutectic point of the extract in a vacuum chamber via evaporative cooling. The extruded ropes tend to expand or foam in the vacuum chamber and the expansion can be used as a means of controlling product density.

PREPARATION OF PARTICULATE MATTER FOR FREEZE DRYING

BACKGROUND OF THE INVENTION

This invention relates to an improved method for freezing extracts preparatory for freeze drying. More particularly, it concerns the formation of an extrudable slush which is then extruded into a vacuum to complete the freezing via evaporative cooling.

In U.S. Pat. No. 3,373,042 issued Mar. 12, 1968 a method of freezing coffee extract wad disclosed wherein a soft slush was prepared via conductive cooling said soft slush being easily shaped or spread on a freezing belt for further conductive cooling to below the eutectic point of the extract. In commonly assigned, pending application Ser. No. 763,345 filed on Sept. 27, 1968 it was disclosed that a soft slush could be prepared and frozen by means other than conductive cooling. Subsequently, work has been done in which it was discovered that a hard slush could be prepared and extruded in the form of ribbons which could be cut into particulate pieces and then completely frozen in a cold air tunnel prior to freeze drying. In this latter work various means of modifying the density and/or appearance were disclosed.

While the foregoing techniques offer particular advantages in the preparation of extracts for freeze drying there is a growing need for other means of preparing freeze dried products with particular characteristics.

SUMMARY

It has now been discovered that an extract can be prepared in the form of a slush and extruded in the form of continuous ropes into a vacuum system wherein the slush may be finally frozen to below the eutectic point of the extract via evaporative cooling. By cooling the extruded slush in a vacuum the product is made to undergo some degree of puffing and said puffing results in some novel characteristics of appearance and also affords some degree of density control over the final freeze dried product. The degree of puffing can be controlled by varying the amount of ice formed in the slush operation prior to extrusion and by varying the vacuum to which the ropes are exposed. The frozen ropes can be sliced or ground into particulate pieces. Alternatively, if a hard slush is being extruded, the ropes can be sliced into particulate pieces at the discharge of the extruder and the individual pieces cooled via evaporative cooling under vacuum.

As used herein the term extract refers to a water solution of soluble solids extracted from natural foods. A typical example of an extract being used commercially in freeze drying today is coffee extract.

The term slush, as used herein, is intended to describe a mixture of ice crystals which have been frozen out of the original extract and the unfrozen liquid extract which now contains a higher level of solids as compared to the initial extract.

The term rope, as used herein, is intended to describe any form such as ribbons, rods, bars, etc. which can be continually discharged from an extruder.

This invention offers the advantage of producing a dry product with a novel appearance and/or a desired density. It is also particularly advantageous for use in a system wherein particulate matter is to be continuously fed from a vacuum chamber into a continuous freeze dryer.

DESCRIPTION OF THE PREFERRED EMBODIMENT

A preferred embodiment of this invention is to continuously freeze a liquid extract containing 20 to 60 percent solids by weight of the extract in order to form a slush which can be extruded in the form of ropes. A lower limit of 20 percent concentration is considered a practical limitation, in that the process of this invention is intended to be used as part of a freeze drying system and it is not considered economical to freeze dry extracts containing more than 80 percent water. An upper limit of 60 percent is generally dictated by the fact that at its eutectic composition, an extract will completely freeze without the formation of ice crystals. The ice crystals are necessary to produce a slush which can be extruded. Since the eutectic composition of many extracts are not sufficiently above 60 percent to permit the formation of sufficient ice crystals, when starting with an extract concentration of above 60 percent solids, the upper limit of 60 percent concentration is considered necessary. Indeed, in many instances if it is desired to produce a hard slush (one which cannot readily be spread after extrusion) the solids concentration should be limited to about 45 percent by weight of the extract. A hard slush would normally be used in practicing this invention if it is desired to slice the ropes into particulate pieces at the discharge of the extruder before puffing has been achieved.

The ice content of slush will generally vary between 10 to 60 percent by weight of the slush in order to achieve an extrudable slush. Normally, with a higher solids content in the initial extract, less ice must be formed in the slush to obtain an extrudable slush. Whether a hard slush (one not readily spreadable) or a soft slush (one which is easily spread on a flat surface, although capable of retaining its shape if not spread) is produced will depend upon the type of extract, the initial solids concentration and the amount of ice formed in the crystallizer. One skilled in the art will be readily able to determine the amount of ice to be formed for a given initial extract. The amount of ice to be formed in the slush will depend upon the final product characteristics to be achieved via the evaporative cooling step which is performed in a vacuum.

Generally the degree of puffing will vary inversely with the degree of hardness of the slush being extruded. Therefore, if the major object in practicing the process of this invention is to achieve a lower density by the expansion of the product, a soft slush should be used. After the puffing and hardening of the extruded rope has been achieved the completely frozen expanded ropes can be cut to any desired particle size distribution by standard slicing or grinding techniques. Also, the degree of puffing will vary with the degree of vacuum. Higher vacuums will cause more violent evaporation and result in a greater degree of puffing.

Alternatively, if it is desired to minimize puffing or to slice the ropes as they are discharged from the extruder prior to puffing then a hard slush should be used. When freeze drying coffee extract it has been found that an extract concentration of 20 to 45 percent and an ice content of 20 to 60 percent by weight of the slush are the parameters within which a hard slush can be achieved.

This invention will be further described by reference to the following examples.

EXAMPLE I

Coffee extract containing 35 percent solids by weight of the extract was chilled in a scraped surface, jacketed heat exchanger in order to form a slush. The slush was equilibrated at 14° F. on discharge from the heat exchanger and was fed to a chilled piston type extruder. The slush from the extruder was discharged through a die in the form of ropes into a vacuum chamber maintained at a pressure of 250 microns of mercury. Puffing was found to occur at the surface of the ropes and produced a rough scaly appearance.

The frozen and puffed ropes were coarse ground and freeze dried. The final dried particles retained the same rough scaly appearance as the frozen ropes.

EXAMPLE II

Coffee extract containing 25 percent solids was slushed and extruded as in example no. 1. The extract was equilibrated at a temperature of about 18° F. prior to extrusion. The ropes were extruded into a vacuum chamber maintained at 350 microns of mercury. It was found that there was some interior puffing but that the surface of the ropes was smooth. After freeze drying, the particulate pieces via this example had a unique bitextural appearance.

We claim:

1. A method of preparing a coffee extract in the form of frozen particulate pieces suitable for freeze drying comprising chilling an extract having a soluble solids content of from 20 to 60 percent by weight of the extract to below 32° F. continuing said chilling thereby freezing ice crystals out of said extract until the resultant mixture of ice crystals and unfrozen extract is a slush containing from 20 to 60 percent ice by weight of the slush; continuously feeding said slush through an extruder; discharging said slush from the extruder in the form of continuous extruded ropes into a vacuum; completely freezing said ropes via evaporative cooling in said vacuum; puffing said ropes while in said vacuum by the sudden release of vapors while they are being cooled by evaporation in said vacuum, controlling the degree of puffing by controlling the degree of vacuum and by controlling the hardness of the extruded ropes as they exit said extruder and enter said vacuum; comminuting the frozen and puffed ropes and obtaining thereby particulate pieces of frozen coffee extract suitable for freeze drying.

2. The process of claim 1 wherein the frozen puffed ropes are ground

A method of preparing a coffee extract in the form of frozen particulate pieces suitable for freeze drying comprising chilling an extract having a concentration of from 20 to 45 percent solids by weight of the extract to below 32° F. continuing said chilling and thereby freezing ice crystals out of said extract until the resultant mixture of ice crystals and unfrozen extract is a hard slush having an ice content of from 20 to 60 percent by weight of the slush, and wherein said hard slush is extrudable but not readily spreadable; continuously feeding said slush through an extruder; discharging said slush from the extruder in the form of continuous extruded ropes into a vacuum; slicing said ropes into particulate pieces as they are discharged from the extruder; completely freezing said particulate pieces via evaporative cooling in said vacuum; puffing said particulate pieces while in said vacuum by the sudden release of vapors while they are being cooled by evaporation in said vacuum; controlling the degree of puffing by controlling the degree of vacuum and by controlling the hardness of the extruded ropes as they exit said extruder and enter said vacuum.

* * * * *